(12) United States Patent
Blanton et al.

(10) Patent No.: US 8,706,033 B2
(45) Date of Patent: Apr. 22, 2014

(54) TK WIRELESS ADAPTER FOR PROVIDING WIRELESS COMMUNICATION BETWEEN A TRANSDUCER AND A COMPUTER

(75) Inventors: Robin Blanton, Grosse Ile, MI (US); Roger Leon Van Elslander, Warren, MI (US); Anthony B. Vink, Plymouth Township, MI (US); Mark P. Zachos, West Bloomfield, MI (US)

(73) Assignee: Dearborn Group Technology, Farmington Hills, MI (US)

( * ) Notice: Subject to any disclaimer, the term of this patent is extended or adjusted under 35 U.S.C. 154(b) by 622 days.

(21) Appl. No.: 12/806,592

(22) Filed: Aug. 17, 2010

(65) Prior Publication Data

US 2012/0077435 A1    Mar. 29, 2012

(51) Int. Cl.
    *H04B 7/00*    (2006.01)
(52) U.S. Cl.
    USPC .......................... 455/41.2; 455/41.1; 455/41.3
(58) Field of Classification Search
    USPC .............. 455/41.1, 41.2, 558, 557, 90.3, 563, 455/569.1, 575.9, 269, 462, 426.1; 361/679.56; 340/870.03; 702/138
    See application file for complete search history.

(56) References Cited

U.S. PATENT DOCUMENTS

| | | | |
|---|---|---|---|
| 6,500,126 B1* | 12/2002 | Brock-Fisher | 600/459 |
| 8,175,839 B2 | 5/2012 | Kurtz | |
| 8,224,256 B2 | 7/2012 | Citrano | |
| 8,326,359 B2 | 12/2012 | Kauffman | |
| 2005/0197796 A1* | 9/2005 | Daigle et al. | 702/107 |
| 2009/0143104 A1* | 6/2009 | Loh et al. | 455/558 |
| 2009/0199022 A1* | 8/2009 | Fukuda | 713/300 |
| 2010/0042764 A1* | 2/2010 | Rodriguez et al. | 710/63 |
| 2010/0332179 A1* | 12/2010 | Kurtz et al. | 702/138 |

* cited by examiner

*Primary Examiner* — Edward Urban
*Assistant Examiner* — Golam Sorowar
(74) *Attorney, Agent, or Firm* — Warn Partners, P.C.

(57) ABSTRACT

An adapter for providing wireless communication between a transducer and a computer. The adapter of the present invention includes a processor and a first connector operable for connecting the adapter to the transducer. The connector is in electrical communication with the processor such that the processor receives at least one measured parameter from the transducer. The present invention also includes at least one radio transmitter in electrical communication with the processor, the processor operable to transfer the measured parameter to the at least one radio transmitter for wirelessly transmitting the measured parameter to the computer. The radio transmitter is able to broadcast in one or more wireless communication protocols. The adapter of the present invention is suitable for operation with any type of transducer that functions as a sensor/detector, an actuator, or the like, and is able to transfer the measured parameter detected by the transducer wirelessly to a computer.

17 Claims, 3 Drawing Sheets

TK WIRELESS ADAPTER FOR PROVIDING WIRELESS COMMUNICATION BETWEEN A TRANSDUCER AND A COMPUTER

GOVERNMENT RIGHTS

This invention was made with Government support under contract W31P4Q-05-A-0017/0006 awarded by the U.S. Army Aviation and Missile Contracting Center. The Government has certain rights in the invention

FIELD OF THE INVENTION

The present invention relates to an adapter for providing wireless communication between a transducer kit and a computer.

BACKGROUND OF THE INVENTION

A transducer is a device that converts one type of energy to another. The conversion can be to/from electrical, electromechanical, electromagnetic, photonic, photovoltaic, or any other form of energy. While the term "transducer" commonly implies use as a sensor/detector, any device which converts energy can be considered a transducer. A transducer, or transducer kit (TK) is often categorized by application: sensor, actuator, or combination.

A transducer in the form of a sensor is used to detect a parameter in one form and report it in another form of energy (usually an electrical and/or digital signal). For example, a pressure sensor might detect pressure (a mechanical form of energy) and convert it to electricity for display at a remote gauge.

A transducer in the form of an actuator accepts energy and produces movement (action). The energy supplied to an actuator might be electrical or mechanical (pneumatic, hydraulic, etc.). An electric motor and a loudspeaker are both transducers, converting electrical energy into motion for different purposes.

Combination transducers have both functions—they both detect and create action. For example, a typical ultrasonic transducer switches back and forth many times a second between acting as an actuator to produce ultrasonic waves, and acting as a sensor to detect ultrasonic waves.

Modern TKs are interfaced with a personal computer through the use of a cable connection, such as a Universal Serial Bus (USB), or the like. The interface allows the computer to record measurements as they are made if the transducer is functioning as a sensor, or send commands to the transducer, if the transducer is functioning as an actuator.

However, using an actual wire connection between a TK and a computer, such as a USB or the like, is limiting because the TK and device under test must be located at a distance in relation to the computer. The distance between the TK and device under test must be substantially equal to or less than the length of the wire because the wire must be connected to both the computer and the transducer. This limits the use of a TK when it is physically impossible to have the device under test in proximity to the computer such that the wire connection can be made between the TK and the computer.

Accordingly, there exists a need for a TK which is able to record desired measurements or parameters of a device under test, and communicate wirelessly with a computer, allowing the computer to record the measurements or parameters, without limiting the location of the computer or the device under test.

SUMMARY OF THE INVENTION

The present invention is an adapter for providing wireless communication between a transducer and a computer. The adapter of the present invention includes a processor and a first connector operable for connecting the adapter to the transducer. The connector is in electrical communication with the processor such that the processor receives at least one measured parameter from the transducer. The present invention also includes at least one radio transmitter in electrical communication with the processor, the processor operable to transfer the at least one measured parameter to the at least one radio transmitter for wirelessly transmitting the at least one parameter to the computer.

The computer has an interrogator which is able to receive communication from the radio transmitter in any one of the wireless communication protocols such that the computer is able to record the measured parameter as desired.

The radio transmitter is able to broadcast in one or more wireless communication protocols to the interrogator. The wireless communication protocols include, but are not limited to, Zigbee, Wifi, infared, Infrared Data Association (IrDA), Bluetooth, Ultra-wideband (UWA), and Z-Wave.

The adapter of the present invention is suitable for operation with any type of transducer that functions as a sensor/detector, an actuator, or the like, and is able to transfer the data detected by the transducer wirelessly to a computer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
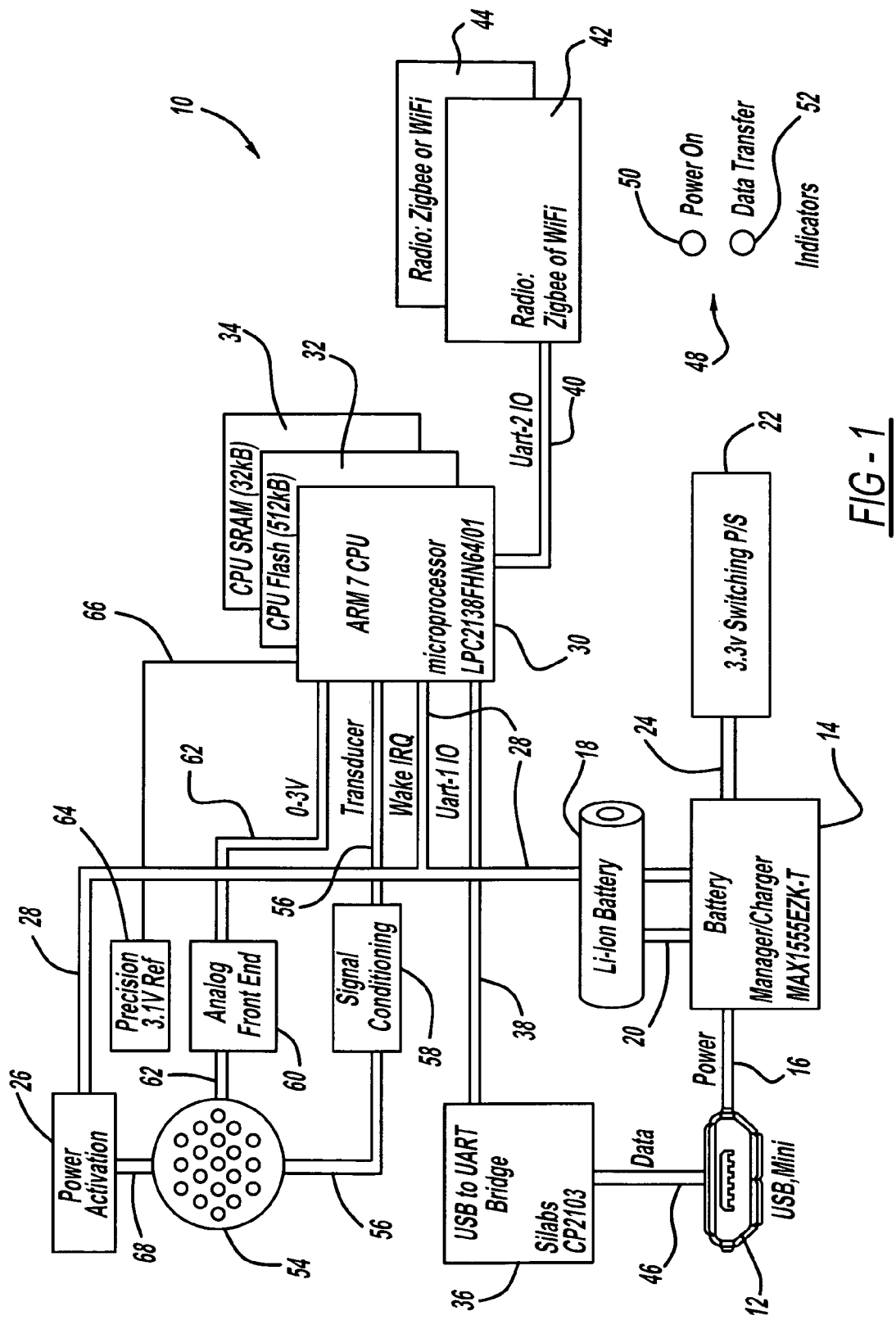
FIG. 1 is a schematic showing the various components of an adapter for providing wireless communication between a transducer kit and a computer, according to the present invention.

A schematic for an adapter according to the present invention for use with a transducer kit (TK) is shown in FIG. 1 generally at 10. The adapter is connectable to a device for reprogramming; this device is often referred to as a "load box." The adapter is also connectable to a charging device through the use of a Universal Serial Bus (USB) connector 12. The connector 12 is in electrical communication with a battery manager/charger 14 through the use of a first power line 16; the battery manager/charger 14 is in electrical communication with a power source, which in this embodiment is a battery 18, through the use of a second power line 20, and a power supply switch 22 through the use of a third power line 24. When the connector 12 is connected to the charging device, the manager/charger 14 is operable to control and direct charge to the battery 18. The battery 18 used in the adapter of the present invention is a lithium-ion battery which is able to retain charge for thirty days when not in use (standby mode), and is capable of four hours of continuous operation when in use (active mode).

The battery manager/charger 14 is also in electrical communication with a power activation switch 26 through the use of a wake interrupt request (IRQ) line 28. The wake IRQ line 28 also branches off to place the power activation switch 26 and battery manager/charger 14 in electrical communication with a processor 30. In this embodiment, the processor is a 32-bit Advanced RISC Machine (ARM) processor 30. The processor 30 has both flash memory 32 as well as Static Random Access Memory (SRAM) 34. The processor 30 is in electrical communication with a USB to Universal Asynchronous Receive/Transmit (UART) Bridge 36 through the use of a first UART line 38. There is a second UART line 40 which extends from the processor 30 to at least one radio transmitter 42. However, in this embodiment, there is a first radio transmitter 42 and a second radio transmitter 44. Both transmitters 42,44 have the capability to transmit in both Zigbee and WiFi communication protocols. The USB to UART Bridge 36 is in electrical communication with the connector 12 by way of a data communication line 46.

Also shown in FIG. 1 is a plurality of indicators, shown generally at 48. There is a first indicator 50 for providing an indication that the power is on or off, and a second indicator 52 for providing an indication that data is being transferred to or from the adapter.

The processor 30 is in electrical communication with a connector 54, which in this embodiment is in the form of a multiple pin connector through the use of a transducer line 56. There is also a signal conditioner 58 along the transducer line 56, which conditions the signal between a transducer 53 (See FIG. 4) and the processor 30. The signal conditioning performed by the signal conditioner 58 may include amplification, filtering, converting, range matching, isolation, or any other process desired by the user. There is also an analog front end 60 in electrical communication with the transducer 53 through the use of a voltage line 62; the voltage line 62 also extends from the analog front end 60 to the processor 30.

Figures 4, 5:
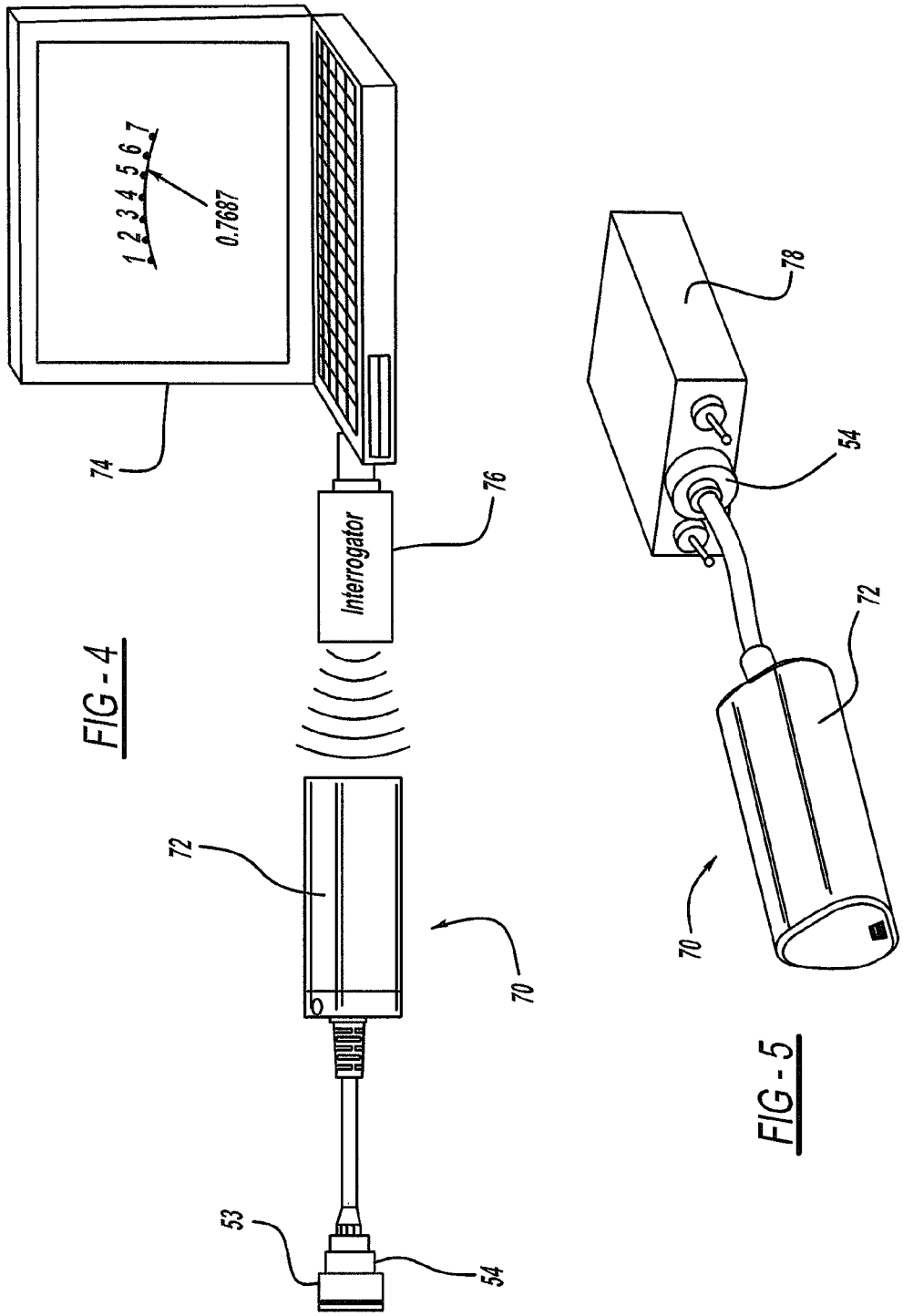
FIG. 4 is a perspective view of an adapter for use with a transducer, with the adapter providing wireless communication between the transducer and the computer, according to the present invention.
FIG. 5 is a perspective view of a load box used for reprogramming an adapter for providing wireless communication between the transducer and the computer, according to the present invention.

Referring to FIG. 5, a load box 78 operable for attachment to the connector 54 of an adapter according to the present invention is shown. The load box 78 is operable for reprogramming the adapter. When connected to the load box 78, and the adapter is operable to be reprogrammed, or updated with different software, if desired.

There is also a voltage reference component 64 in electrical communication with the processor 30 through the use of a voltage reference line 66 for providing a precise reference voltage of 3.1 Volts. Since the transducer kit used with the adapter of the present invention measures a desired parameter in terms of a voltage, the reference voltage is used as a reference to determine the magnitude of the measurement, and therefore must be precise. The power activation switch 26 is also in electrical communication with the connector 54 through the use of a second Wake IRQ line 68.

Figure 2:
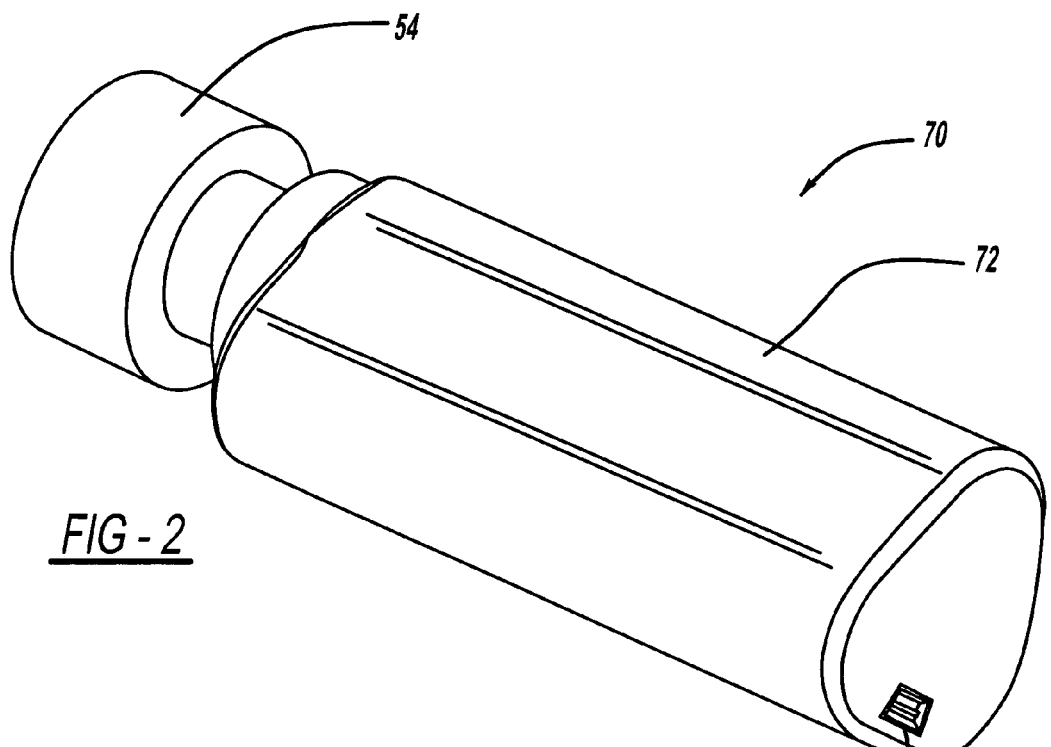
FIG. 2 is a first perspective view of an adapter for providing wireless communication between a transducer kit and a computer, according to the present invention.
Figure 3:
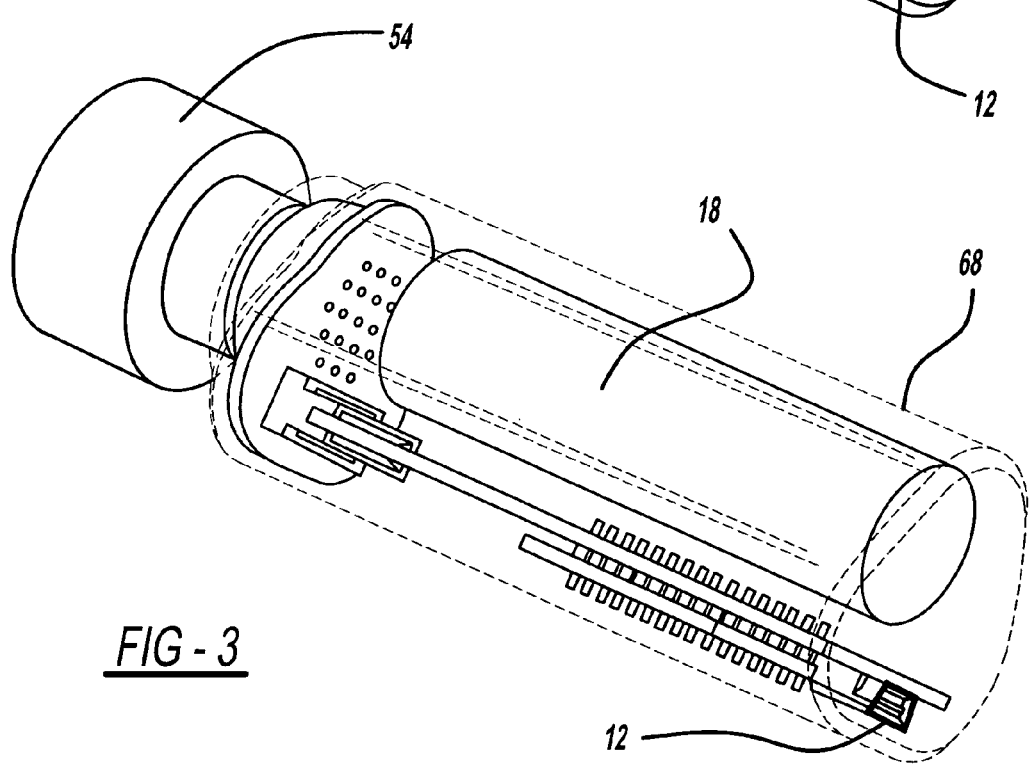
FIG. 3 is a second perspective view of an adapter for providing wireless communication between a transducer kit and a computer, according to the present invention.

Referring to FIGS. 2-4, a TK adapter according to the present invention is shown generally at 70. The adapter 70 has an outer casing 72, which surrounds of the components of the adapter 70. The wireless communication provided by the adapter 70 allows the transducer 53 to communicate with any remotely located computer 74, such as a desktop computer, laptop computer, or the like. The computer 74 has an interrogator 76 which is operable to receive and transmit signals between the radio transmitters 42,44, and then deliver and receive the signals to and from the computer 74, allowing the TK to communicate wirelessly with the computer 74.

In operation, the adapter 70 is in a dormant or inactive state when not in use, where minimal power is used from the battery 18 to power the adapter such that the connector 54 is able to detect a signal received from the TK. The power activation switch 26 interacts with the connector 54 in such a manner that if a signal is sent to the connector 54, the signal is detected by the power activation switch 26, and the switch 26 activates the processor 30, thereby activating the adapter 70. The TK for use with the adapter 70 of the present invention is a commercial, off the shelf TK. The processor 30 then begins to communicate with the TK through the transducer line 56 and the voltage line 66. As the adapter 70 receives signals from the TK, the processor 30 sends the signals to the radio transmitters 42,44 through second UART line 48.

Once the radio transmitters 42,44 receive the signals from the processor 30, the transmitters 42,44 broadcast the signal and the computer 74 receives the signal. While the transmitters 42,44 used with the adapter 70 of the present invention broadcast in either Zigbee or WiFi communication protocols, it is within the scope of the invention that other communication protocols may be used. Other communication protocols include, but are not limited to, Infrared Data Association (IrDA), Bluetooth, Ultra-wideband (UWA), and Z-Wave. Additionally, the transmitters 42,44 are also operable to broadcast in different communication protocols. For example, in one embodiment the first transmitter 42 broadcasts in a Zigbee communication protocol, and the second transmitter 44 broadcasts in a Bluetooth protocol. The computer then receives the signal and is able to process the data received as desired by the user.

The TK is capable of measuring various types of parameters, such as current, voltage, resistance, or the like, for measuring a desired parameter, such as, but not limited to temperature, pressure, force. The data for the parameter measured by the TK is transferred to the adapter 70 through the connector 54. The transmission of data between the adapter 70 and the computer 74 is wireless because of the radio transmitters 42,44 and the interrogator 76.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adapter for providing wireless communication between a transducer and a computer, comprising:
    a processor;
    a first connector operable for connecting said adapter to said transducer, said first connector in electrical communication with said processor such that said processor receives at least one measured parameter from said transducer;
    at least one radio transmitter in electrical communication with said processor, said processor operable to transfer said at least one measured parameter to said at least one radio transmitter for wirelessly transmitting said at least one parameter to said computer;
a voltage reference component in electrical communication with the processor and the transducer, wherein the voltage reference component provides a precise reference voltage to determine the magnitude of the at least one measured parameter;
a load box selectively connectable with the first connector, wherein the load box, when connected to the first connector, reprograms the adapter or updates the adapter with different software;
a power source;
a battery manager/charger operable for delivering a charge to said power source;
a power supply switch operable with said battery manager/charger for charging the operation of said power source between a standby mode and an active mode; and
a power activation switch operable with said first connector to detect a connection between said first connector and said transducer, such that when said connection between said first connector and said transducer is detected by said power activation switch and power said power source is in standby mode, said power activation switch sends a signal to said processor, and said processor is activated, and said signal is also sent to said batter manage/charger such that said power source is changed to said active mode.

2. The adapter for providing wireless communication between a transducer and a computer of claim 1, further comprising an interrogator connected to said computer operable for wirelessly receiving said at least one measured parameter from said at least one radio transmitter and deliver said at least one measured parameter to said computer.

3. The adapter for providing wireless communication between a transducer and a computer of claim 1, wherein said at least one radio transmitter is operable for broadcasting in at least one wireless communication protocol.

4. The adapter for providing wireless communication between a transducer and a computer of claim 3, said at least one wireless communication protocol being one selected from the group consisting of Zigbee, Wifi, infared, Infrared Data Association (IrDA), Bluetooth, Ultra-wideband (UWA), and Z-Wave.

5. The adapter for providing wireless communication between a transducer and a computer of claim 3, said at least one radio transmitter further comprising:
a first radio transmitter operable for receiving said at least one measured parameter from said processor, and broadcasting said at least one data measurement to said computer in said at least one wireless communication protocol; and
a second radio transmitter operable for receiving said at least one data measurement from said processor, and broadcasting said at least one data measurement to said computer in said at least one communication protocol.

6. The adapter for providing wireless communication between a transducer and a computer of claim 5, said at least communication protocol further comprising a plurality of communication protocols, wherein said first radio transmitter broadcasts in a first of said plurality of said communication protocols, and said second radio transmitter broadcasts in a second of said plurality of said communication protocols.

7. The adapter for providing wireless communication between a transducer and a computer of claim 1, wherein said power source is a battery.

8. The adapter for providing wireless communication between a transducer and a computer of claim 1, further comprising:
a second connector operable for being selectively connected to a device operable for providing a charge to said power source; and
a universal serial bus (USB) to universal asynchronous receive/transmit (UART) bridge operable for placing said second connector in electrical communication with said processor, allowing said processor to command said battery manager/charger to transfer charge from said device operable for providing a charge to said power source.

9. An adapter for providing wireless communication between a transducer and a computer, comprising:
a processor operable for receiving one or more data measurements;
a first connector operable for connection with one or more transducers, said one or more data measurements transferred from said transducer to said processor through said first connector;
at least one radio transmitter operable for broadcasting in a plurality of wireless communication protocols, said processor operable to transfer said one or more data measurements to said at least one radio transmitter, and said computer operable to communicate with said at least one radio transmitter in one or more of said plurality of wireless communication protocols such that said at least one radio transmitter broadcasts said one or more data measurements to said computer;
a voltage reference component in electrical communication with the processor and the transducer, wherein the voltage reference component provides a precise reference voltage to determine the magnitude of the one or more data measurements;
a load box selectively connectable with the first connector, wherein the load box, when connected to the first connector, reprograms the adapter or updates the adapter with different software;
a power source;
a battery manager/charger operable for transferring charge to said power source, and charging the operation of said power source between an active mode and a stand-by mode;
a power supply switch operable for controlling said battery manager/charger for switching said power source between said active mode and said stand-by mode; and
a power activation switch in electrical communication with said first connector operable for detecting a signal being sent from said transducer such that when said signal is detected by said power activation switch and said power source is in said stand-by mode, said power activation switch sends a signal to said processor, and said processor is activated, and said signal is also sent to said battery manager/charger such that said battery is changed to said active mode.

10. The adapter for providing wireless communication between a transducer and a computer of claim 9, further comprising an interrogator operable for communicating with said at least one radio transmitter in one or more of said plurality of wireless communication protocols such that said one or more data measurements are transferred from said at least one radio transmitter through said interrogator to said computer.

11. The adapter for providing wireless communication between a transducer and a computer of claim 9, said plurality of wireless communication protocols being one selected from the group consisting of Zigbee, Wifi, infared, Infrared Data Association (IrDA), Bluetooth, Ultra-wideband (UWA), and Z-Wave.

12. The adapter for providing wireless communication between a transducer and a computer of claim 9, said at least one radio transmitter further comprising:
 a first radio transmitter operable for broadcasting to said computer in a first of said plurality of wireless communication protocols for transferring said one or more data measurements to said computer; and
 a second radio transmitter operable for broadcasting to said computer in a second of said plurality of wireless communication protocols for transferring said one or more data measurements to said computer, said first of said plurality of wireless communication protocols being different from said second of said plurality of wireless communication protocols.

13. The adapter for providing wireless communication between a transducer and a computer of claim 9, said power source further comprising a battery.

14. The adapter for providing wireless communication between a transducer and a computer of claim 9, further comprising:
 a second connector operable for placing said battery manager/charger in electrical communication with a device operable for providing a charge to said power source; and
 a universal serial bus (USB) to universal asynchronous receive/transmit (UART) bridge in electrical communication with said second connector and said processor for providing communication with said processor and said device operable for providing a charge to said power source, allowing said processor to command said battery manager/charger to transfer charge from said device operable for providing a charge to said power source.

15. An adapter for providing wireless communication between a transducer and a computer, comprising:
 a processor;
 a first connector selectively connectable to a transducer, said processor operable to receive at least one data measurement from said transducer when said first connector is connected to said transducer;
 a first radio transmitter operable for broadcasting in one or more of a plurality of wireless communication protocols, said processor operable to transfer said at least one data measurement to said first radio transmitter;
 a second radio transmitter operable for broadcasting in one or more of said plurality of wireless communication protocols, said processor operable to transfer said at least one data measurement to said second radio transmitter;
 an interrogator operable for communicating with said first radio transmitter and said second radio transmitter in one or more of said plurality of wireless communication protocols for receiving said at least one data measurement;
 a voltage reference component in electrical communication with the processor and the transducer, wherein the voltage reference component provides a precise reference voltage to determine the magnitude of the at least one data measurement;
 a load box selectively connectable with the first connector, wherein the load box, when connected to the first connector, reprograms the adapter or updates the adapter with different software,
 a battery;
 a battery manager/charger operable for transferring charge to said battery, and changing the operation of said battery between an active mode and a standby mode;
 a power supply switch operable for controlling said battery manager/charger for switching said battery between said active mode and said standby mode; and
 a power activation switch in electrical communication with said battery manager/charger and said processor said power activation switch operable for detecting a voltage delivered to said first connector such that when said voltage is detected by said power activation switch and said battery is in a standby mode, said power activation switch sends a signal to said processor, and said processor is activated, and said signal is also sent to said battery manager/charger such that said battery is changed to said active mode.

16. The adapter for providing wireless communication between a transducer and a computer of claim 15, said plurality of wireless communication protocols being one selected from the group consisting of Zigbee, Wifi, infared, Infrared Data Association (IrDA), Bluetooth, Ultra-wideband (UWA), and Z-Wave.

17. The adapter for providing wireless communication between a transducer and a computer of claim 15, further comprising:
 a second connector operable for placing said battery manager/charger in electrical communication with a device operable for providing a charge to said battery; and
 a universal serial bus (USB) to universal asynchronous receive/transmit (UART) bridge in electrical communication with said second connector and said processor for providing communication with said processor and said device operable for providing a charge to said power source, allowing said processor to command said battery manager/charger to transfer charge from said device operable for providing a charge to said power source.

\* \* \* \* \*